United States Patent
Bultemeier

(10) Patent No.: US 8,838,445 B1
(45) Date of Patent: Sep. 16, 2014

(54) METHOD OF REMOVING CONTAMINATION IN ACOUSTIC NOISE MEASUREMENTS

(75) Inventor: Eric James Bultemeier, Seattle, WA (US)

(73) Assignee: The Boeing Company, Chicago, IL (US)

( * ) Notice: Subject to any disclaimer, the term of this patent is extended or adjusted under 35 U.S.C. 154(b) by 323 days.

(21) Appl. No.: 13/270,217

(22) Filed: Oct. 10, 2011

(51) Int. Cl.
*G01L 21/02* (2006.01)

(52) U.S. Cl.
USPC ........... 704/228; 704/226; 704/233; 704/222; 381/94.3; 381/94.7; 381/92

(58) Field of Classification Search
USPC ......... 704/226–228, 233, 219, 222; 381/94.3, 381/92, 94.7, 94.1
See application file for complete search history.

(56) References Cited

U.S. PATENT DOCUMENTS

| | | | | |
|---|---|---|---|---|
| 5,319,736 | A | * | 6/1994 | Hunt .............................. 704/227 |
| 5,530,655 | A | * | 6/1996 | Lokhoff et al. .......... 375/240.03 |
| 5,572,621 | A | * | 11/1996 | Martin .......................... 704/227 |
| 5,572,623 | A | * | 11/1996 | Pastor ........................... 704/233 |
| 5,706,394 | A | * | 1/1998 | Wynn ............................ 704/219 |
| 5,749,068 | A | * | 5/1998 | Suzuki .......................... 704/233 |
| 5,781,883 | A | * | 7/1998 | Wynn ............................ 704/226 |
| 5,933,495 | A | * | 8/1999 | Oh ........................... 379/406.08 |
| 5,978,824 | A | * | 11/1999 | Ikeda ............................ 708/322 |
| 6,097,820 | A | * | 8/2000 | Turner ......................... 381/94.3 |
| 6,556,967 | B1 | | 4/2003 | Nelson et al. |
| 7,983,907 | B2 | * | 7/2011 | Visser et al. .................. 704/227 |
| 2010/0296668 | A1 | * | 11/2010 | Lee et al. ..................... 381/94.7 |
| 2011/0264447 | A1 | * | 10/2011 | Visser et al. ................. 704/208 |

OTHER PUBLICATIONS

Valin, Jean-Marc, The Speex Codec Manual Version 1.2 Beta 3, published at http://www.speex.org/docs/ by Xiph.org, Dec. 2007.

Various authors, G.729, published at http://en.wikipedia.org/w/index.php?title=G.729&oldid=387731203 by Wikimedia Foundation, Inc., revision as of Sep. 29, 2010.

Ephraim and Van Trees, A Spectrally-based Signal Subspace Approach for Speech Enhancement, IEEE ICASSP-95, vol. 1, pp. 804-807, 1995.

ETSI, European digital cellular telecommunications system; Half rate speech Part 6: Voice Activity Detector (VAD) for half rate speech traffic channels (GSM 06.42), published by the European Telecommunications Standards Institute, 1995.

TI, Inc., TMS320C54CST VAD, AGC, CNG Algorithm product brochure, published at http://www.ti.com/lit/ug/sprs018a/sprs018a.pdf by Texas Instruments, Inc., Mar. 2003.

TI, Inc., Voice Activity Detector (VAD) Algorithm User's Guide, published at http://www.ti.com/lit/ug/spru635/spru635.pdf by Texas Instruments, Inc., Mar. 2003.

Kabal, ECSE-412: Discrete-Time Signal Processing Winter 2008 course project, published at http://www-mmsp.ece.mcgill.ca/Courses/2007-2008/ECSE412B/Project/Project.html (code at http://www-mmsp.ece.mcgill.ca/Courses/2007-2008/ECSE412B/Project/MATLAB/VAD.m) by McGill University, Apr. 2008.

* cited by examiner

*Primary Examiner* — Vijay B Chawan
(74) *Attorney, Agent, or Firm* — Melissa Glauber

(57) ABSTRACT

A method for the automatic removal of speech contamination from an acoustic noise signal. The method includes the steps of: (a) receiving an input acoustic noise signal; (b) automatically detecting speech contamination in the received acoustic noise signal using a VAD; (c) automatically identifying uncontaminated segments of the received acoustic noise signal based upon a decision value output by the VAD; (d) automatically assembling a congruous uncontaminated acoustic noise signal from the identified uncontaminated segments of the received acoustic noise signal; and (e) outputting the congruous uncontaminated acoustic noise signal. Also, systems implementing such a method.

19 Claims, 7 Drawing Sheets

Fig. 2C

Identifying the indices of decision value transitions in the smoothed series of decision values
130a

Fig. 2D

Applying the series of decision values to the received acoustic noise signal 130b

METHOD OF REMOVING CONTAMINATION IN ACOUSTIC NOISE MEASUREMENTS

FIELD

The present disclosure is directed to systems and methods for performing acoustic noise measurements and, more particularly, to systems and methods for the removal of undesired speech contamination from environmental acoustic noise measurements.

BACKGROUND

Acoustic noise measurements are used in many environments in order to analyze and address operating equipment noise, aerodynamic noise, vibrational resonances, acoustic isolation technology effectiveness, damping technology effectiveness, and the like. When seeking to test stationary equipment, acoustic engineers can create well controlled operating environments for acoustic noise measurements by deactivating surrounding equipment, excluding unnecessary personnel, developing non-verbal signals for communications with necessary personnel, and even moving or testing the equipment within highly controlled environments such as anechoic chambers. On the other hand, when seeking to test noise within vehicles such as automobiles or aircraft, acoustic engineers only infrequently have the ability to create controlled operating environments. Private testing tracks and temporary restricted airspaces are comparatively rare and, in the former case, heavily utilized, so that it is relatively difficult and/or expensive to obtain access to them. However, acoustic noise measurements performed in public environments such as highways and general aviation airspace frequently require verbal coordination between the vehicle's operator (driver or pilot) and some other individual, such as a test engineer, a chase vehicle driver, an air traffic control operator, or other aircraft pilots, in order to coordinate the test regime, adapt the test regime to the presence of other traffic, and adjust and repeat the test regime in response to unplanned-for conditions.

In the case of aircraft acoustic noise measurements, and most particularly cockpit acoustic noise measurements, speech contamination of the measurements is a recurring problem. An aircraft under test must monitor and respond to any communications by air traffic control or other aircraft pilots at essentially any time. Consequently, acoustic noise measurements obtained in this environment commonly have undesired speech contamination due to cockpit communications. Such speech contamination may require the repetition of portions of the test regime or additional post-processing of the acoustic noise measurements. Such additional post-processing is typically performed by having a person listen to a noise measurement recording, manually identify segments within the recording with little or no speech contamination, and manually isolate those limited segments for analytical post-processing. As a result this additional post-processing can be time consuming, expensive, and, to a degree, inconsistent since the degree of speech contamination that will be tolerated by a reviewer will vary from circumstance to circumstance and time to time according to the individual reviewer's judgment.

SUMMARY

The applicant has developed systems and methods for automatically detecting and removing undesired speech contamination from environmental acoustic noise measurements. The disclosed systems and methods most particularly use the automatic detection of speech contamination using a Voice Activity Detector or "VAD," as well as the automatic identification of uncontaminated segments of an acoustic noise signal and automatic assembly of the identified uncontaminated segments into a congruous acoustic noise measurement sample. The systems and methods thus lessen the need to repeat acoustic noise measurements due to speech contamination, as well as the need for manual review and identification of speech contamination prior to the analytical post-processing of acoustic noise measurements.

In one aspect, a method for the automatic removal of speech contamination from an acoustic noise signal. The method includes the steps of: (a) receiving an input acoustic noise signal; (b) automatically detecting speech contamination in the received acoustic noise signal using a VAD; (c) automatically identifying speech contaminated and uncontaminated segments of the received acoustic noise signal based upon a decision value output by the VAD; and (d) automatically assembling a congruous uncontaminated acoustic noise signal from the identified uncontaminated segments of the received acoustic noise signal. The method may also include the step of: (e) outputting the congruous uncontaminated acoustic noise signal for separate analytical post-processing.

In another aspect, a system for performing acoustic noise measurements. The system includes a hardware interface 1 for receiving an acoustic noise signal, at least one processor 210 in communication with the hardware interface 1, and at least one memory 220 associated with the processor 210. The at least one processor 210 is configured to include a frame parser 20 and a VAD 40, and further configured to execute at least the steps of: (a) receiving an input acoustic noise signal through the hardware interface; (b) automatically detecting speech contamination in the received acoustic noise signal using the frame parser and the VAD; (c) automatically identifying uncontaminated segments of the received acoustic noise signal; and (d) automatically assembling a congruous uncontaminated acoustic noise signal.

BRIEF DESCRIPTION OF THE DRAWINGS

FIGS. 2C and 2D are detailed schematic diagrams of an identification step.

DETAILED DESCRIPTION

Figure 1:
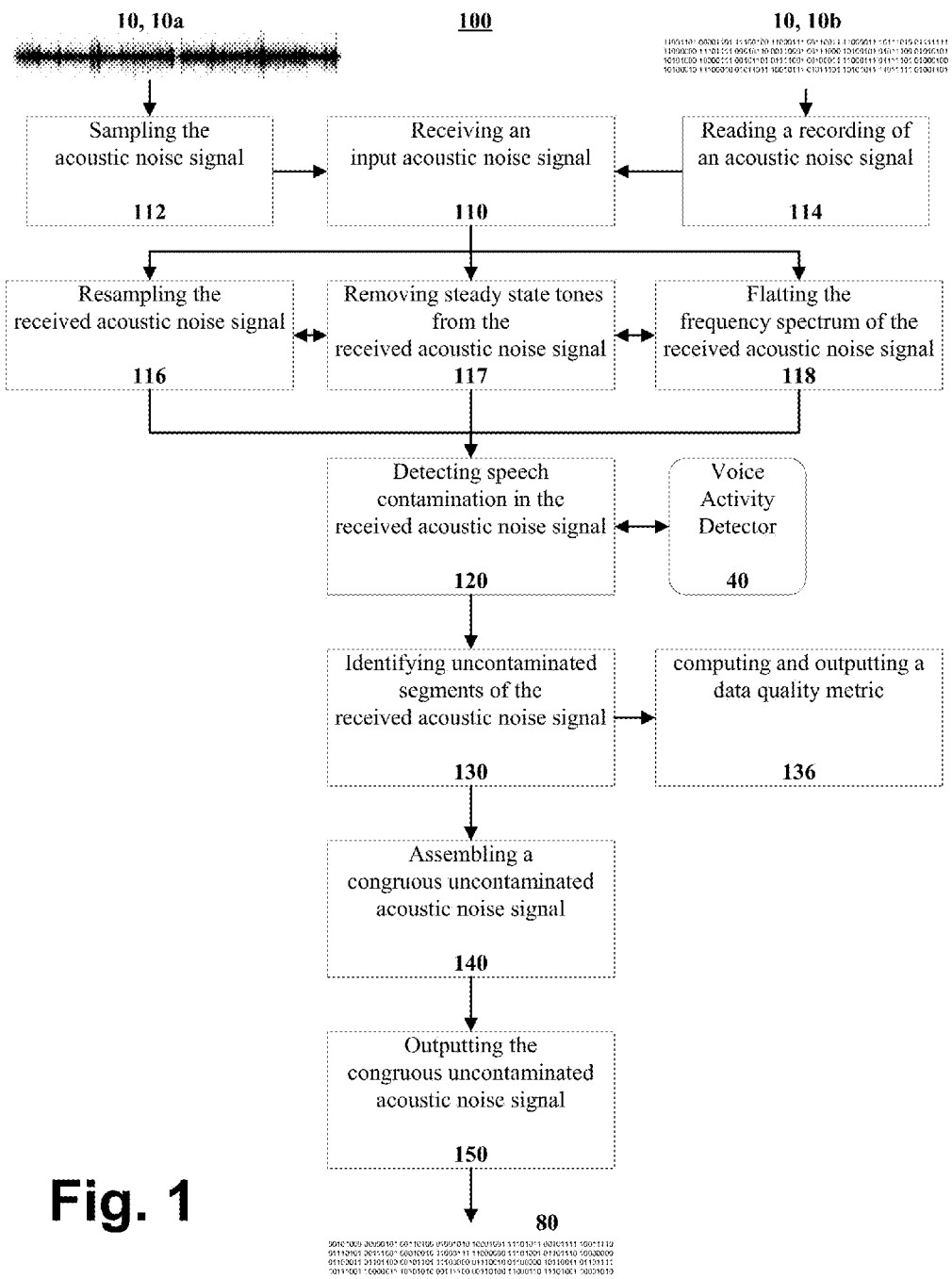
FIG. 1 is a schematic diagram of a method for the removal of speech contamination from an acoustic noise signal.

With initial reference to FIG. 1, a first aspect of the disclosure is a method for the automatic removal of speech contamination from a received acoustic noise signal 10. The method 100 comprises the steps of receiving an input acoustic noise signal 110, automatically detecting speech contamination in the received acoustic noise signal 120 using a VAD 40, automatically identifying uncontaminated segments of the received acoustic noise signal 130, and automatically assembling a congruous uncontaminated acoustic noise signal 140. The method may subsequently involve analytical post-processing of the congruous uncontaminated acoustic noise signal. Alternately, the method may include the step of outputting the congruous uncontaminated acoustic noise signal 150 for deferred or separate analytical post-processing by other means.

The receiving step 110 most typically involves sampling or reading an acoustic noise signal 10 through a hardware interface 1. More specifically, the receiving step 110 may include the step of sampling the acoustic noise signal 112, with representative hardware for sampling including a digital audio interface 2 connected to one or more microphones or microphone-like sensing devices. The sampled acoustic noise signal 10a may be a digitized form of an analog acoustic noise signal, obtained from a microphone and processed through an analog-to-digital (A/D) converter in the digital audio interface 2, or a stream of digital acoustic noise data obtained from so-called "digital microphones" operating in accordance with the AES 42 standard (or other digital audio interface standards) and received through the digital audio interface 2. Alternately, the receiving step may include the step of reading a recording of the acoustic noise signal 114, with representative hardware for reading including a digital audio interface 2 connected to one or more analog or digital audio tape players, a storage interface 4 to/for computer storage media, a processor and processor-executable program or subroutine for receiving an audio file transmitted or streamed across a communications network interface 6, or the like. The read acoustic noise signal 10b may be a digitized form of an analog recording, processed through an analog-to-digital (A/D) converter in the digital audio interface 2, or a copy of a recorded digital acoustic noise data representative of the analog acoustic noise signal, received through the digital audio interface 2, storage interface 4, or communications network interface 6.

In an optional step subsequent to the receiving step 110, the method may include the step of resampling the received acoustic noise signal from a native or first sampling rate to a non-native or second sampling rate 116. As explained in further detail below, the detection step 120 may be automated using a VAD 40 having a restricted range of valid input data sampling rates. The resampling step 116 consequently transforms the received acoustic noise signal 10 from an invalid input data stream into a valid input data stream for use by the detection step 120. An exemplary native or first sampling rate may be 48,000 Hz, and an exemplary non-native or second sampling rate may be 44,100 Hz, 22,050 Hz, 11,025 Hz, or 8,000 Hz. Hardware and processes for resampling audio to and from various sampling rates will be known to those of ordinary skill in the art.

In another optional step subsequent to the receiving step 110, the method may include the step of removing steady state tones from the received acoustic noise signal 117. Such steady state tone removal may be used to remove selected sources of constant or quasi-steady state noise from the received acoustic noise signal 10 in order to lessen interference between a non-speech contribution to the acoustic noise signal and proper operation of the VAD 40. For example, step 117 may replace the spectral peaks of constant or quasi-steady state tones in the received acoustic noise signal 10 with least squares estimates of the stochastic broadband spectrum. Of course, other mathematical techniques for "subtracting" tonal information from acoustic signals and acoustic noise measurements may be used to accomplish this function. Hardware and software implemented processes for removing steady state noise from digital audio signals using, e.g., bandpass filters, notch filters, frequency-dependent (de)amplification, and the like will be known to those of ordinary skill in the art.

In yet another optional step subsequent to the receiving step 110, the method may include the step of flattening the frequency spectrum of the received acoustic noise signal 118. Such flattening may be used to mitigate the effects of low frequency random noise upon proper operation of the VAD 40. For example, step 118 may apply a pre-whitening filter to the received acoustic noise signal 10 so that the filtered acoustic noise signal has a generally flat power spectral density across the frequencies of interest. Systems and methods for flattening the spectrum of digital audio for use with VAD algorithms are referenced in U.S. Pat. No. 6,556,967 issued to Nelson et al., and discussed in Ephraim and van Trees, *A Spectrally-based Signal Subspace Approach for Speech Enhancement*, IEEE ICASSP-95, Vol. 1, pp. 804-807 (1995).

The aforementioned optional steps 117 and 118 more generally fall within the ambit of performing speech enhancement upon the received acoustic noise signal 10. It will be recognized that various known techniques may be used to alter the received acoustic noise signal 10 so as to improve the performance of the VAD 40, and that such techniques will necessarily alter the received acoustic noise signal 10 in ways which can be detrimental to accurate analytical post-processing of the acoustic noise measurements. In such circumstances, the method may duplicate the received acoustic noise signal 10 to create two instances of digital data, one subject to the optional steps 116, 117, and/or 118, and one not subject to at least one of the optional steps 116, 117, and 118, with the assembling step 140 operating upon the latter instance to produce a congruous uncontaminated acoustic noise signal 80. For example, a first instance may be subjected to each of steps 116, 117, and 118 and passed to the detecting step 120, while a second instance is subjected to none of steps 116, 117, and 118 and passed to the assembly step 140. As an additional example, a first instance may be subjected to each of steps 116, 117, and 118 and passed to the detecting step 120, while a second instance is subjected to only step 117 to produce an intermediate acoustic noise signal at a native or first sampling rate which omits selected constant or quasi-steady state tones. The resultant congruous acoustic noise measurement sample 80 would then, of course, generally lack those selected tones.

Figure 2A:
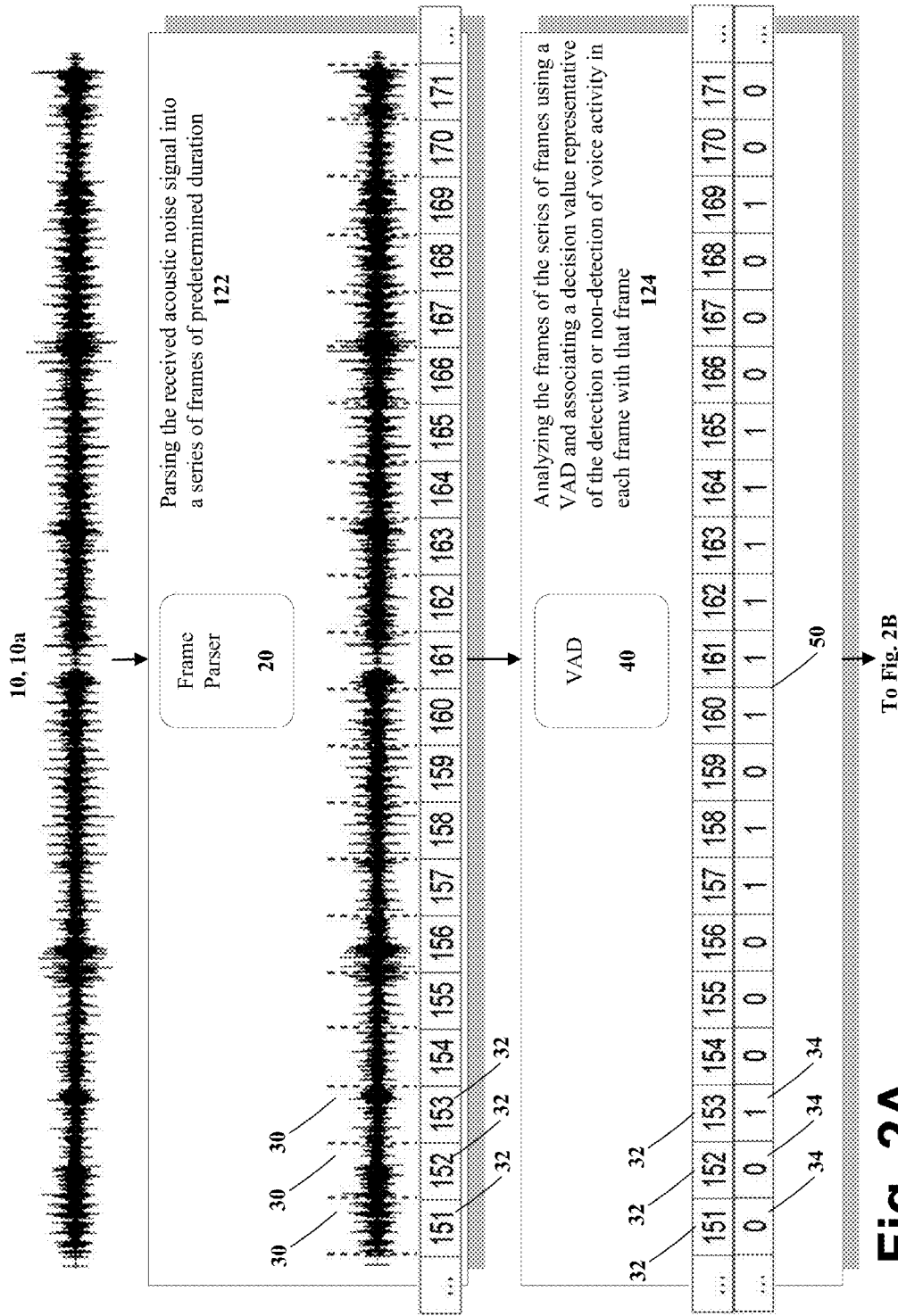
FIGS. 2A and 2B are detailed partial schematic diagrams of a detection step.

The detecting step 120 makes use of the aforementioned Voice Activity Detector or VAD 40. More specifically, with reference to FIGS. 2A-2B, the detecting step 120 includes the steps of parsing the received acoustic noise signal into a series of frames of predetermined duration 122, analyzing the frames of the series of frames using a VAD and associating a decision value representative of the detection or non-detection of voice activity in each frame with that frame 124, and smoothing the series of decision values associated with the series of frames 126. For example, a received acoustic noise signal 10 sampled or resampled as a series of acoustic noise measurements at 22,050 Hz may be parsed by a frame parser 20 into a series of frames 30 of 10 ms duration each (2205 measurements per frame) prior to being passed to the VAD 40. Other sampling rates and other frame durations may be used depending upon the requirements of the VAD. Representative VADs include devices implementing the methods described in ITU Standard G.729 or ETS Standard 300 581-6, as well as the SPIRIT VAD implementation available for Texas Instruments' TMS320 series digital signal processors. The VAD 40 may operate upon each frame 30 and output a decision value 34, such as logical false or "0" representing no voice detection event or a logical true or "1" representing a voice detection event, which is then associated with that frame 30 in a short term memory, an intermediate data stream, or some other temporary record 50 to figuratively "mark" that frame. The associated decision values 34 in the temporary record 50 may then be smoothed to enhance the consistency of the detection/ non-detection decision, to ensure a minimum length of uncontaminated acoustic noise signal lacking speech contamination, etc.

Figure 2B:
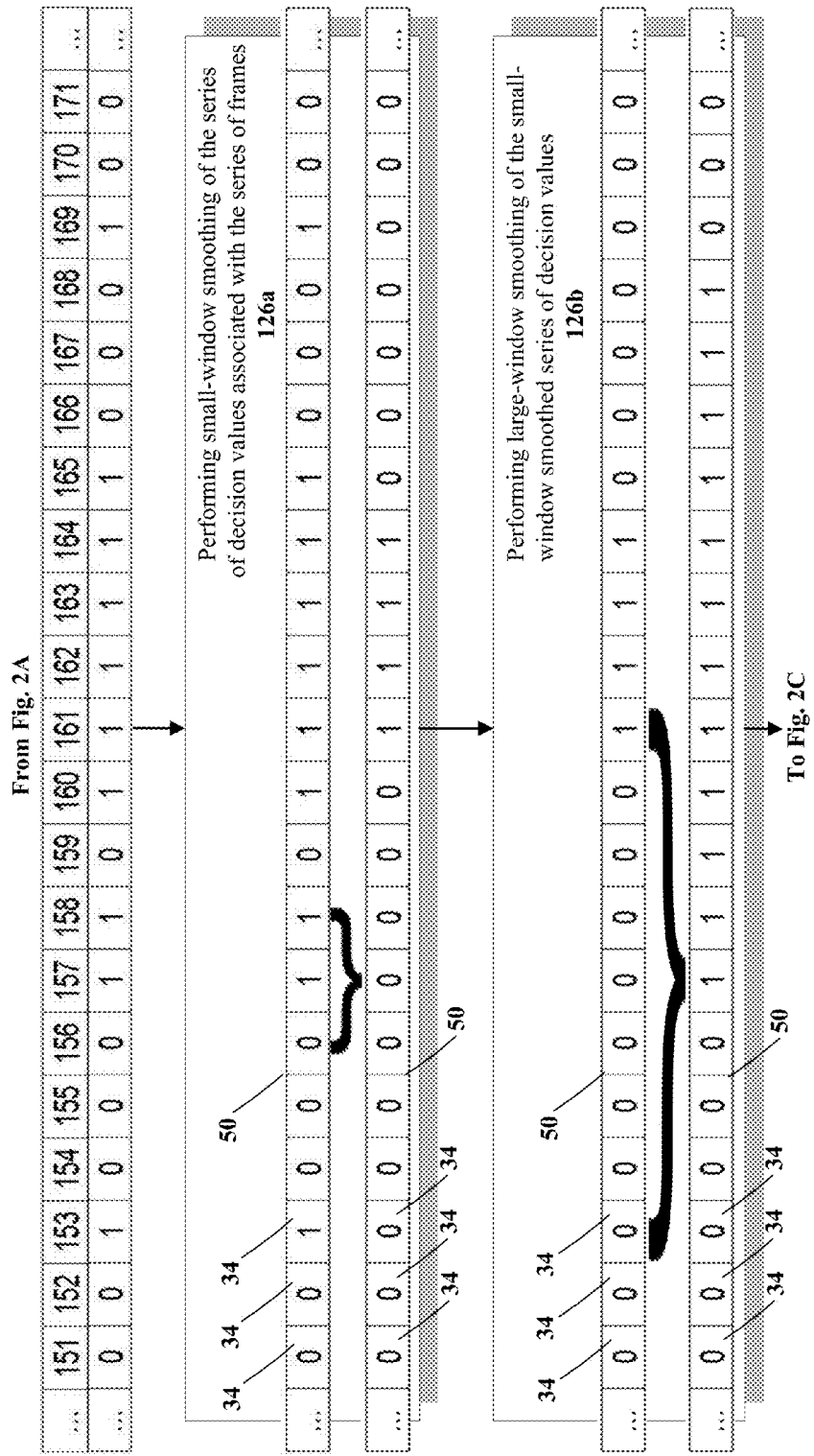

With particular reference to FIG. 2B, the smoothing step 126 of detecting step 120 may include the step of performing small-window smoothing of the series of decision values associated with the series of frames 126a to enhance the consistency of the detection/non-detection determination, followed by the step of performing large-window smoothing of the small-window smoothed series of decision values 126b to ensure a predetermined minimum length of uncontaminated acoustic noise signal. Step 126a may be performed by taking a center weighted average of a small number of decision values in the temporary record 50 associated with consecutive frames (such as 3-7 consecutive frames), rounding the result to favor a non-detection result (i.e., rounding to a non-detection result value), and updating the decision value associated with the center frame to that of the rounded result. The updated values may be associated with the center frame in another short term memory, intermediate data stream, or temporary record 50, or held in a smaller instance of such structures until the original value is no longer needed by the smoothing window. Consequently, short intervals of voice detection, e.g., 1-3 consecutive or non-consecutive frames 30, are treated as noise. For example, a center weighted average of decision values associated with 3 consecutive frames may be used, and if the decision value associated with only 1 or 2 frames indicates a voice detection event within the small window, the decision value associated with the center frame may be set to 0, representing no voice detection event, but if the decision value associated with all 3 frames indicates a voice detection event throughout the small window, the decision value associated with the center frame may be set to 1, representing a voice detection event.

Step 126b may be performed by taking a center weighted average of a large number of decision values in the temporary record 50 associated with consecutive frames (shown as 9 consecutive frames for ease of illustration), rounding the result to favor a detection result (i.e., rounding to a detection result value), and updating the value associated with the center frame to that of the rounded result. As in step 126a, the updated values may be associated with the center frame in another short term memory, intermediate data stream, or temporary record 50, or held in a smaller instance of such structures until the original value is no longer needed by the smoothing window. Consequently, short intervals of voice detection, e.g., 3 or more consecutive frames, would be treated as speech contamination. For example, a center weighted average of small-window smoothed decision values associated with 25 consecutive frames may be used, representing a predetermined minimum length of uncontaminated acoustic noise signal of 250 ms (assuming exemplary frames of 10 ms duration as noted above), and if the value associated with only 3 frames indicates a voice detection event within the large window, the value associated with the center frame may be set to 1, representing a voice detection event, but if the value associated with all 25 frames indicates no voice detection event throughout the large window, the value associated with the center frame may be set to 0, representing no voice detection event. The large number of decision values should be greater than the small number of decision values, and based upon a predetermined minimum length of uncontaminated acoustic noise signal for use in the identification and assembly steps. For example, if the frames 30 are of 10 ms duration each, a large number such as 25 frames may be used for the large window, establishing a minimum length of 250 ms. An exemplary range of 9-25 frames may be used to establish a minimum length of uncontaminated acoustic noise signal of ~100-250 ms for an exemplary 10 ms frame duration. An exemplary predetermined minimum length of ~100-250 ms is preferred regardless of frame duration to lessen artificial discontinuities in the congruous uncontaminated acoustic noise signal 80 while avoiding excessive alteration of uncontaminated segments 60 of the received acoustic noise signal 10.

Referring now to FIGS. 2C and 2D, the identification step 130 makes use of the series of decision values associated with the series of frames, identifying uncontaminated segments 60 of the received acoustic noise signal 10 and, at least by implication, speech contaminated segments of the received acoustic noise signal 10 based upon the smoothed series of decision values. In one implementation of the method, shown in FIG. 2C, the identification step 130 may include identifying the indices of decision value transitions in the smoothed series of decision values 130a. Reference numeral 60 is shown with respect to the smoothed series of decision values 34, however it will be understood that the uncontaminated segments are actually portions of the received acoustic noise signal 10 which correspond to the frames and decision values, as shown in FIG. 2D, rather than to the smoothed series of decision values 34 itself. As an example, the index of the start of an uncontaminated segment 132 of the received acoustic noise signal 10 may be determined by identifying a "start" transition from a decision value representing a voice detection event to a decision value representing no voice detection event; and the index of the end of an uncontaminated segment 134 of the received acoustic noise signal 10 may be determined by identifying an "end" transition from a decision value representing no voice detection event to a decision value representing a voice detection event. By indexing the series of decision values 34 with respect to the series of frames 30, e.g., by maintaining a corresponding counter of decision values, directly referencing a corresponding decision value index, maintaining a counter of frames considered by the identification step, or indirectly referencing a frame index 32 associated with each frame 30, and scaling this number by the predetermined duration of the frames (to obtain a time index) or both the predetermined duration of the frames and the sampling rate of the received acoustic noise signal 10 (to obtain a sample index within the digitized series of acoustic noise measurements), the identification step may identify uncontaminated segments of the received acoustic noise signal 10 by relative position within the signal.

In another implementation of the method, shown in FIG. 2D, the identification step 130 may include the step of applying the series of decision values to the received acoustic noise signal 130b to produce an intermediate or "time accurate" acoustic noise signal 62, with contaminated samples within the received acoustic noise signal being replaced with a null or other reserved value. For example, where the VAD outputs a logical false or "0" representing no voice detection event and a logical true or "1" representing a voice detection event, the step may reverse the individual decision values in the smoothed series of decision values, e.g., substitute a "1" for frames with no voice detection event and a "0" for frames with a voice detection event, multiply that portion of the acoustic noise signal corresponding to each frame by the reversed decision value, e.g., perform a one-to-one or matrix multiplication operation between the decision value 34 and a portion of the received acoustic noise signal 10 corresponding to the associated frame 30, and pass a "time accurate" acoustic noise signal 62 containing uncontaminated segments 60 of the acoustic noise signal separated by the null or reserved value "0" to the assembling step 140. In one specific example, the series of decision values 34 associated with the series of frames 30 may be reversed, as described above, resampled to the first or native sampling rate to form a decision signal, and applied to an instance of the received acoustic noise signal 10 not subjected to a resampling step 116 by a multiplying mixer 74. Other processes and methods of implementing reserved values for use in applying the decision values 34 and/or a decision signal to the received acoustic noise signal 10 will be apparent to those of ordinary skill in the art.

The method may advantageously include the step of computing and outputting a data quality metric based upon the relative proportion of the received acoustic noise signal identified as containing speech contaminated versus uncontaminated segments 136. For example, the smoothed series of decision values provided to the identification step 130 may be summed and divided by the total number of decision values, e.g., by any one of the aforementioned counter of decision values, decision value index (the last or maximum index value), counter of frames, or frame index 32 (the last or maximum index value), to create a fractional metric of speech contaminated frames versus uncontaminated frames in the received acoustic noise signal 10. Alternately, the indices of decision value transitions identified by the identification step 130 may be used to calculate the lengths of the uncontaminated segments 60 (whether in terms of frames 30, time index, or sample index) versus the length of the overall received acoustic noise signal 10 to create a fractional metric of uncontaminated acoustic noise signal length versus received acoustic noise signal length. Still alternately, the resampled decision signal or "time accurate acoustic noise signal 62 may be analyzed with respect to the null or other reserved value to create a data quality metric. Those of skill in the art will appreciate that such metrics can be presented in a wide variety of forms, such that the aforedescribed examples are to be considered as being illustrative of the information input into a computation of the data quality metric, rather than a particular mode of calculation of the data quality metric or particular output form of the data quality metric. Alternate modes of calculation and alternate forms of expressing the metric will be readily apparent to persons of skill in the art.

Figure 3A:
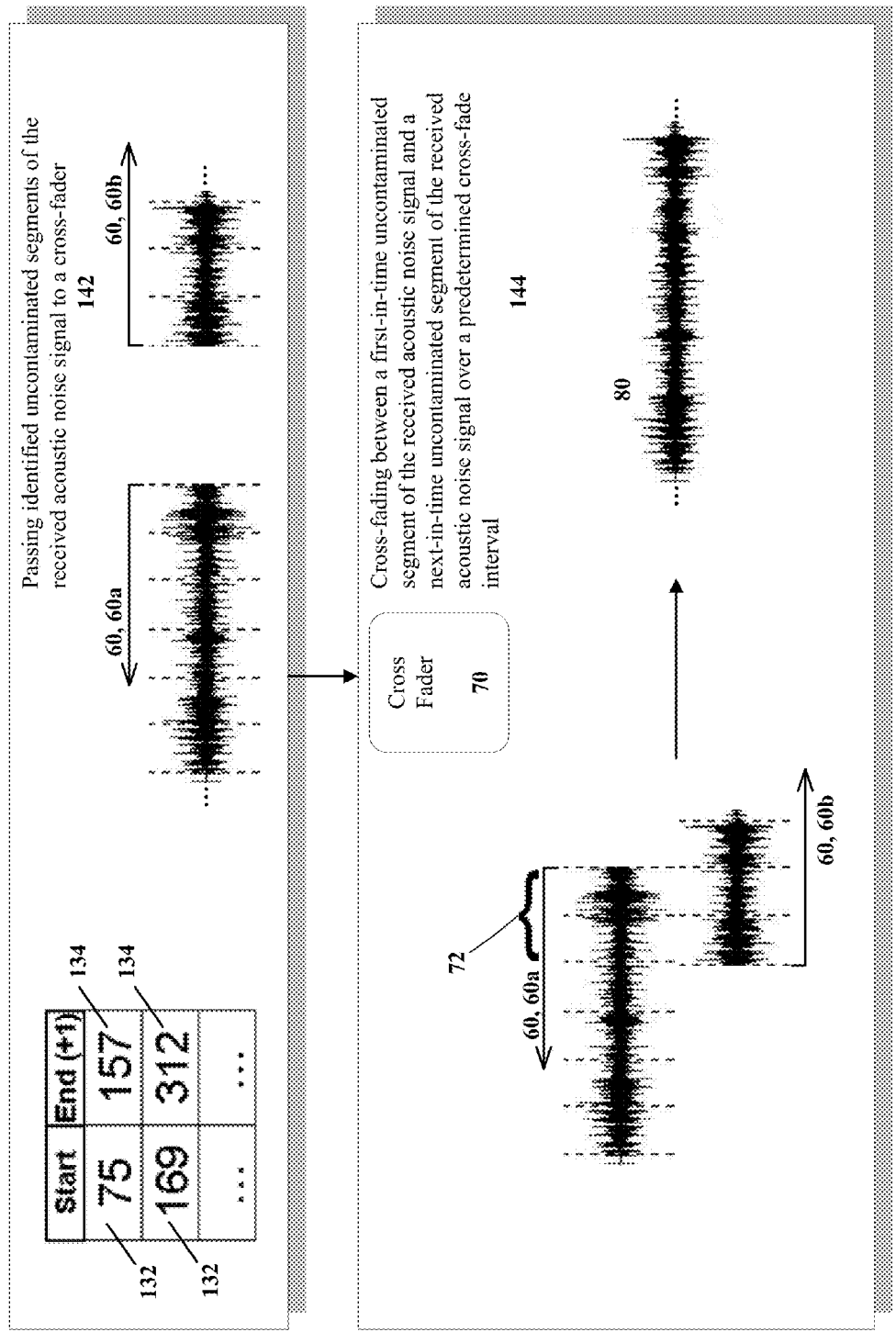
FIG. 3 is a detailed schematic diagram of an assembly step.
Figure 3B:
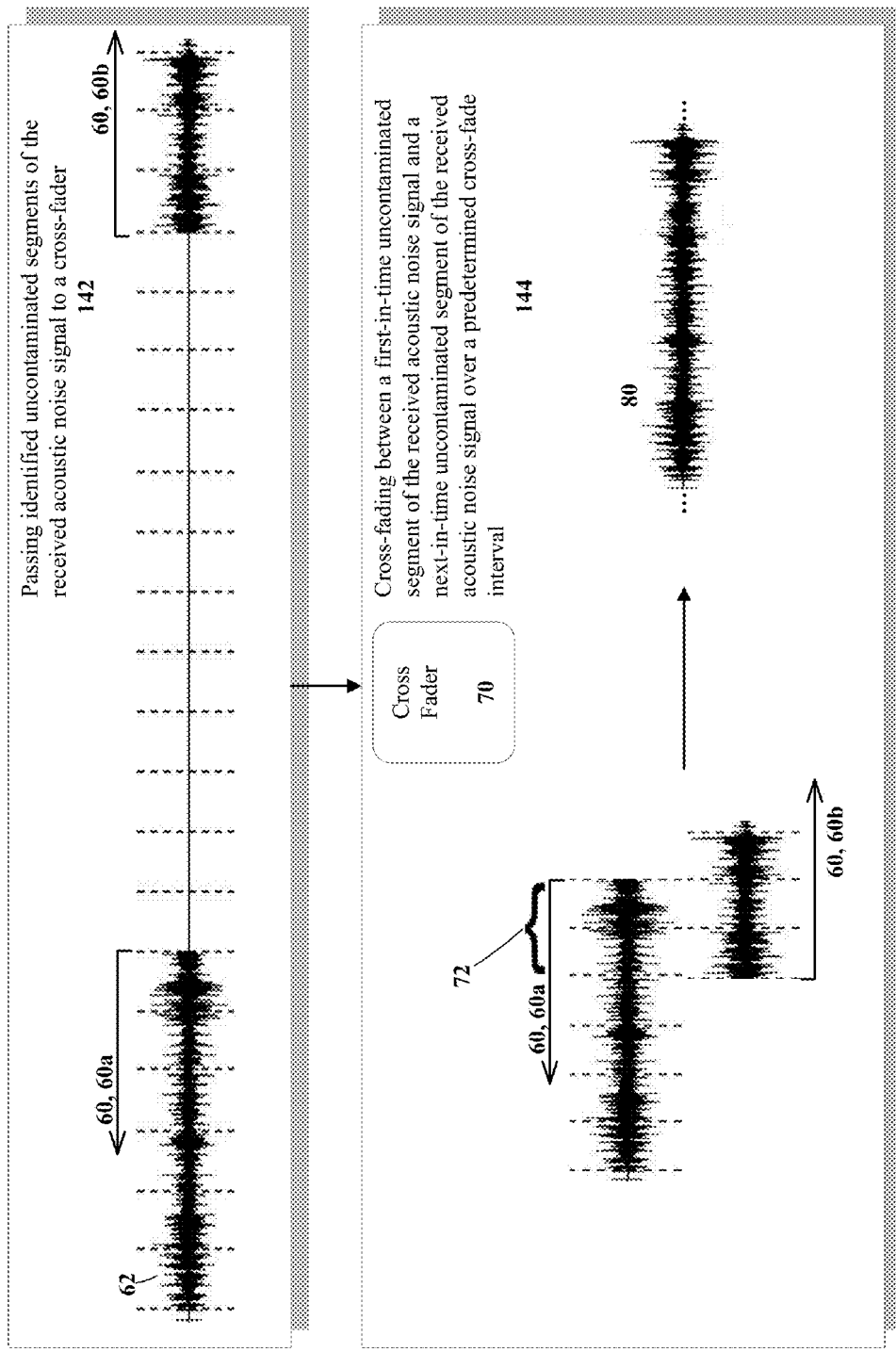

Referring now to FIG. 3, the assembling step 140 makes use of the output of the identifying step 130 to produce a congruous uncontaminated acoustic noise signal 80 from the received acoustic noise signal 10. The assembly step may be limited to joining a first-in-time uncontaminated segment of the received acoustic noise signal and a next-in-time uncontaminated segment of the received acoustic noise signal in sequential order. However, in general, the assembly step includes the steps of passing identified uncontaminated segments of the received acoustic noise signal to a cross-fader 142, and cross-fading between a first-in-time uncontaminated segment of the received acoustic noise signal and a next-in-time uncontaminated segment of the received acoustic noise signal over a cross-fade interval 144. The cross-fade interval 72 may be a predetermined cross-fade interval or a dynamically determined cross-fade interval (dynamically varying based upon the signal characteristics of the first-in-time and next-in-time uncontaminated segments), but should be less than or equal to the predetermined minimum length of uncontaminated acoustic noise signal. Cross-fading between discongruous uncontaminated segments of the received acoustic noise signal is used to prevent the introduction of artificial discontinuous changes into the assembled acoustic noise signal, and consequent artifacts from appearing in the spectrum or signal power of the congruous uncontaminated acoustic noise signal 80 during analytical post processing, as opposed to actual changes in noise signal spectrum or noise signal power occurring in the environment. In one implementation of the method, shown in FIG. 3A, the indices 132, 134 of decision value transitions identified in the identification step 130 are applied to the received acoustic noise signal 10 to designate the first-in-time and next-in-time uncontaminated segments 60 of the received acoustic noise signal 10, and the designated first-in-time and next-in-time uncontaminated segments 60 of the received acoustic noise signal 10 are passed to a cross-fader 70 to cross-fade between a trailing portion of the first-in-time uncontaminated segment 60a and a leading portion of the next-in-time uncontaminated segment 60b each corresponding, respectively, to a predetermined cross-fade interval 72. In another implementation of the method, shown in FIG. 3B, the intermediate or "time accurate" acoustic noise signal 62, which in the event of speech contamination would include first-in-time and next-in-time uncontaminated segments 60 of the received acoustic noise signal, is passed the cross-fader 70. The cross-fader 70 may be configured to exclude samples containing the null or reserved value, cross-fading between a trailing portion of the first-in-time uncontaminated segment 60a immediately preceding the null or reserved value or series of values and a leading portion of the next-in-time uncontaminated segment 60b immediately succeeding the null or reserved value or series of values. The congruous uncontaminated acoustic noise signal 80 may then, at least temporarily, be stored in a memory 220.

The outputting step 150 most typically involves transmitting or recording the congruous uncontaminated acoustic noise signal 80 through a hardware interface 1. More specifically, the outputting step 150 may include the step of transmitting the congruous uncontaminated acoustic noise signal 152, with representative hardware for transmitting the congruous uncontaminated acoustic noise signal 80 including a digital audio interface 2, a processor and processor-executable program or subroutine for transmitting an audio file or audio stream over a communications network interface 6, or the like. Alternately, the outputting step 150 may include the step of recording the congruous uncontaminated acoustic noise signal on a computer readable storage medium 154, with representative hardware for recording including a digital audio interface 2 connected to one or more analog or digital audio tape players, a storage interface 4 to/for computer storage media, a processor and processor-executable program or subroutine for transmitting or streaming an audio file across a communications network interface 6, or the like. Representative, computer storage media may include internal or external hard drives, component or peripheral flash storage media such as "SSDs" or "thumb drives," optical storage media, or the like.

Alternate embodiments of the method 100 may omit the assembly step 140, outputting not the congruous uncontaminated acoustic noise signal 80, but the "time accurate" acoustic noise signal 62 produced by some implementations of the identification step 130. Such an alternate embodiment might require the manual assembly or selection of uncontaminated segments 60 of the received acoustic noise signal 10 for analytical post-processing, but would still usefully lessen, if not eliminate, inconsistency in the degree of speech contamination that would be tolerated by human reviewers. In addition, such an embodiment may have applications beyond environmental acoustic noise measurements. For instance, an embodiment may be employed as a security or privacy enhancement to an acoustic monitoring device, permitting the recording or real-time transmission of environmental acoustic noise but omitting instances of identified speech. Such instances could be recorded or transmitted "as is," yielding stretches of uncontaminated acoustic noise separated by stretches of the null or other reserved value which, being a constant, would effectively constitute silence. Alternately, such instances could be replaced with recorded or randomly generated acoustic noise. This artificial acoustic noise could even be selected or generated so as to seem to be a generally congruous and non-discontinuous extension of a preceding uncontaminated segment 60 in order to minimize the perception that instances of identified speech have been altered. Such selection or generation would be based upon real-time analytical post-processing of at least a preceding uncontaminated segment 60 to obtain noise spectrum and/or noise power parameters for use in an artificial noise generator or pattern matching algorithm.

Figure 4:
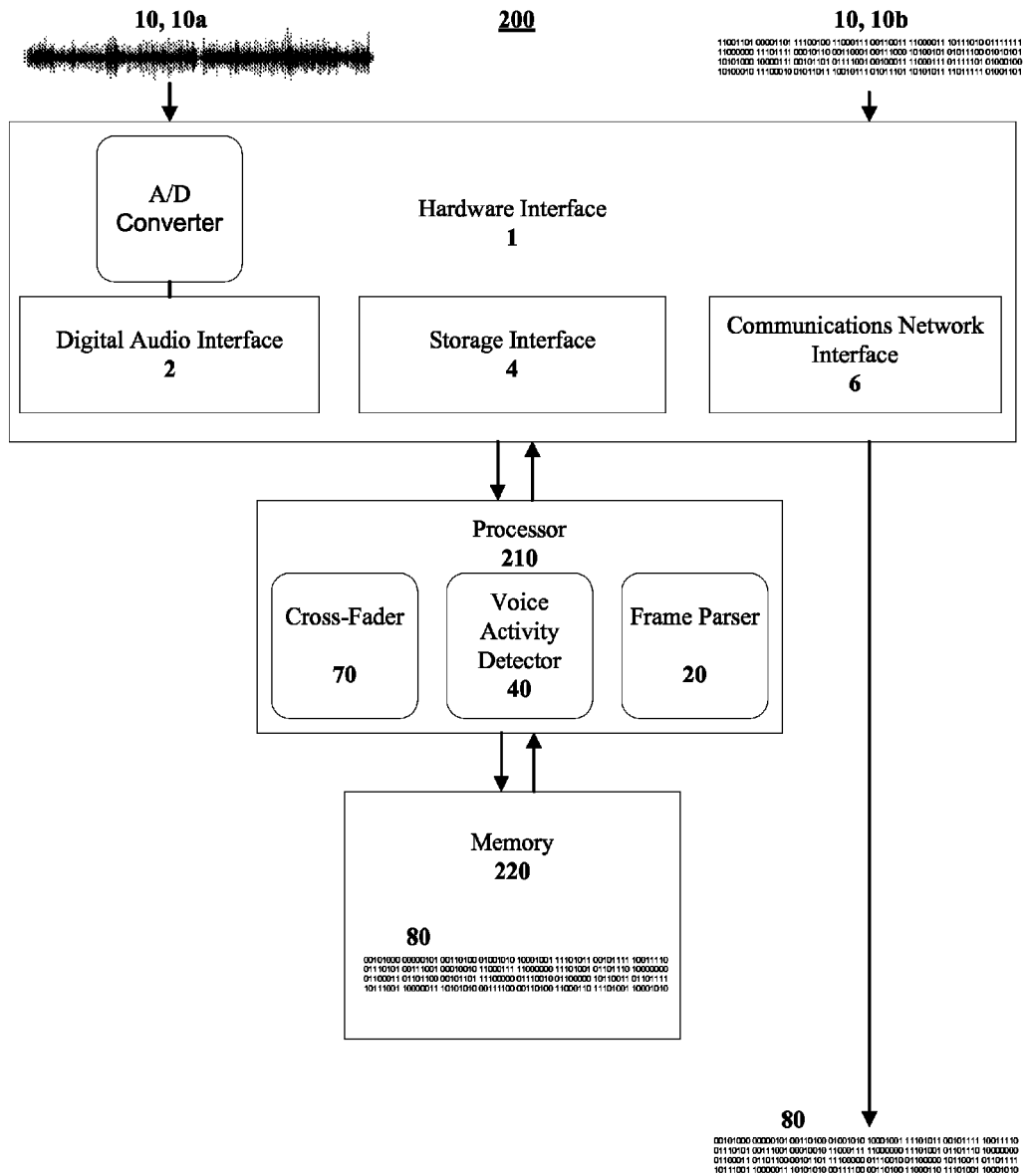
FIG. 4 is a schematic diagram of a system for the removal of speech contamination from an acoustic noise signal.

With reference to FIG. 4, a second aspect of the disclosure is a system 200 implementing the disclosed method 100. The system 200 comprises a hardware interface 1 for receiving an acoustic noise signal, at least one processor 210 in communication with the hardware interface 1, and at least one memory 220 associated with the processor 210. The at least one processor 210 is configured to include a frame parser 20 and a VAD 40, and further configured to execute the steps of the method 100, i.e., at least the steps of:

(a) receiving an input acoustic noise signal through the hardware interface, (b) automatically detecting speech contamination in the received acoustic noise signal using the frame parser and the VAD;

(c) automatically identifying uncontaminated segments of the received acoustic noise signal; and (d) automatically assembling a congruous uncontaminated acoustic noise signal.

For example, the at least one processor 210 may be a digital signal processor or DSP executing a program stored in the at least one memory 220 which configures the processor 210 to carry out the method steps. As a further illustrative example, the at least one processor 210 may be a general purpose processor in operative communication with an ASIC processor functioning as the VAD 40, with the general purpose processor executing a program stored in the at least one memory 220 which otherwise configures the general purpose processor to carry out the method steps. The at least one processor 210 is preferably configured to include a software cross-fader 70 for the assembly of the congruous uncontaminated acoustic noise signal 80, however in other implementations where assembly is limited to joining uncontaminated segments of the received acoustic noise signal, a cross-fader 70 may be omitted.

The various aspects and implementations described above are intended to be illustrative in nature, and are not intended to limit the scope of the invention. Any limitations to the invention will appear in the claims as allowed.

What is claimed is:

1. A method for the automatic removal of speech contamination from an acoustic noise signal, the method comprising the steps of:
   (a) receiving an input acoustic noise signal;
   (b) automatically detecting speech contamination in the received acoustic noise signal using a VAD;
   (c) automatically identifying speech contaminated and uncontaminated segments of the received acoustic noise signal based upon decision values output by the VAD; and
   (d) automatically assembling a congruous uncontaminated acoustic noise signal from the identified uncontaminated segments of the received acoustic noise signal.

2. The method of claim 1, wherein the detecting step includes the steps of:
   parsing the received acoustic noise signal into a series of frames of predetermined duration;
   analyzing the frames of the series of frames using the VAD and associating a decision value output by the VAD for each frame with that frame; and
   smoothing the series of decision values associated with the series of frames.

3. The method of claim 2, wherein the smoothing step includes the steps of:
   performing small-window smoothing of the series of decision values associated with the series of frames, wherein the small-window smoothing favors a non-detection result; and
   performing large-window smoothing of the small-window smoothed series of decision values, wherein the large-window smoothing favors a detection result, and wherein the window of the large-window smoothing is larger than the window of the small-window smoothing.

4. The method of claim 3, wherein performing small-window smoothing includes the steps of taking a center weighted average of a small number of decision values associated with consecutive frames, rounding the result to favor a non-detection result, and updating the decision value associated with the center frame to that of the rounded result.

5. The method of claim 3, wherein performing large-window smoothing includes the steps of taking a center weighted average of a large number of decision values associated with consecutive frames, rounding the result to favor a detection result, and updating the value associated with the center frame to that of the rounded result.

6. The method of claim 3, wherein the identifying step identifies uncontaminated segments of the received acoustic noise signal based upon the smoothed series of decision values.

7. The method of claim 6, wherein the smoothed series of decision values is indexed with respect to the series of frames, and wherein the identifying step includes identifying the indices of decision value transitions in the smoothed series of decision values to identify the start and the end of uncontaminated segments of the received acoustic noise signal.

8. The method of claim 7, wherein the assembling step includes the steps of:
   applying the identified indices to the received acoustic noise signal to designate a first-in-time uncontaminated segment of the received acoustic noise signal and a next-in-time uncontaminated segment of the received acoustic noise signal;
   passing the first-in-time uncontaminated segment of the received acoustic noise signal and next-in-time uncontaminated segment of the received acoustic noise signal to a cross-fader; and
   cross-fading between a trailing portion of the first-in-time uncontaminated segment and a leading portion of the next-in-time uncontaminated segment over a predetermined cross-fade interval.

9. The method of claim 6, wherein the identifying step includes applying the smoothed series of decision values to the received acoustic noise signal to produce an intermediate acoustic noise signal with contaminated samples within the received acoustic noise signal being replaced with a reserved value.

10. The method of claim 9, wherein the decision value associated with no voice detection event is a logical false or "0," wherein the decision value associated with a voice detection event is a logical true or "1," and the identification step includes the steps of:
  reversing the individual decision values of the smoothed series of decision values; and
  multiplying portions of the received acoustic noise signal corresponding to the series of frames by the reversed decision value associated with each frame.

11. The method of claim 9, wherein the assembling step includes the steps of:
  passing the intermediate acoustic noise signal to a cross-fader; and
  cross-fading between a trailing portion of the first-in-time uncontaminated segment and a leading portion of the next-in-time uncontaminated segment over a predetermined cross-fade interval, wherein the cross-fader is configured to exclude samples containing the reserved value.

12. The method of claim 1, further comprising the step of:
  computing and outputting a data quality metric based upon the relative proportion of the received acoustic noise signal identified as containing speech contaminated versus uncontaminated segments.

13. The method of claim 1, further comprising the step of:
  (e) outputting the congruous uncontaminated acoustic noise signal.

14. A system for the automatic removal of speech contamination from an acoustic noise signal, the system comprising:
  a hardware interface for receiving an acoustic noise signal;
  at least one processor in communication with the hardware interface, wherein the at least one processor is configured to include a frame parser and a VAD; and
  at least one memory associated with the at least one processor;
  wherein the at least one processor is further configured to execute the steps of:
    (a) receiving an input acoustic noise signal through the hardware interface,
    (b) automatically detecting speech contamination in the received acoustic noise signal using the frame parser and the VAD;
    (c) automatically identifying speech contaminated and uncontaminated segments of the received acoustic noise signal; and
    (d) automatically assembling a congruous uncontaminated acoustic noise signal from the identified uncontaminated segments of the received acoustic noise signal.

15. The system of claim 14, wherein the at least one processor is further configured to execute the steps of:
  parsing the received acoustic noise signal into a series of frames of predetermined duration;
  analyzing the frames of the series of frames using the VAD and associating a decision value output by the VAD for each frame with that frame; and
  smoothing the series of decision values associated with the series of frames.

16. The system of claim 15, wherein execution of the smoothing step includes the steps of:
  performing small-window smoothing of the series of decision values associated with the series of frames, wherein the small-window smoothing favors a non-detection result; and
  performing large-window smoothing of the small-window smoothed series of decision values, wherein the large-window smoothing favors a detection result, and wherein the window of the large-window smoothing is larger than the window of the small-window smoothing.

17. The system of claim 14, wherein the hardware interface comprises one of the group consisting of a digital audio interface, a storage interface, and a communications network interface.

18. The system of claim 14, where in the at least one processor is general purpose processor in operative communication with an ASIC processor functioning as the VAD.

19. The system of claim 14, wherein the at least one processor is configured to include a software cross-fader.

* * * * *